United States Patent [19]
Yoshida et al.

[11] Patent Number: 5,720,201
[45] Date of Patent: Feb. 24, 1998

[54] PRESSING MACHINE

[75] Inventors: Akihiro Yoshida, Gifu-ken; Yoichi Uno, Aichi-ken, both of Japan

[73] Assignee: Kabushiki Kaisha Yamada Dobby, Japan

[21] Appl. No.: 590,132

[22] Filed: Jan. 23, 1996

[30] Foreign Application Priority Data

Dec. 5, 1995 [JP] Japan ................................. 7-339848

[51] Int. Cl.[6] ...................................... F16H 21/34
[52] U.S. Cl. ...................................... 74/44; 100/282
[58] Field of Search ...................... 74/44; 100/282

[56] References Cited

U.S. PATENT DOCUMENTS

| | | | |
|---|---|---|---|
| 47,748 | 5/1865 | Phelps | 74/44 |
| 64,450 | 5/1867 | Rowell | 74/44 |
| 2,093,495 | 9/1937 | Thompson | 74/44 |

FOREIGN PATENT DOCUMENTS

| | | | |
|---|---|---|---|
| 774350 | 12/1934 | France | 74/44 |
| 61-42707 | 3/1986 | Japan . | |

Primary Examiner—Allan D. Herrmann
Attorney, Agent, or Firm—Webb Ziesenheim Bruening Logsdon Orkin & Hanson, P.C.

[57] ABSTRACT

A pressing machine is characterized by including a plurality of crankshafts supported by a frame such that their axes of rotation extend in parallel, a yoke which connects the crankshafts so as to transmit the rotating motion of at least one crankshaft to another crankshaft, and a plurality of connecting rods connected at one end portions thereof to eccentric portions of the crankshafts and connected at the opposite ends thereof to a moving body which is mounted on the frame so as to reciprocate.

6 Claims, 4 Drawing Sheets

PRESSING MACHINE

BACKGROUND OF THE INVENTION

1. Field of the Invention

The present invention relates to a pressing machine wherein a moving body such as a slide or a dynamic weight is reciprocated by virtue of a rotating motion of plural crank shafts.

2. Prior Art

There is known a pressing machine wherein a slide is reciprocated by synchronous rotation of plural crank shafts (see, for example, Japanese Utility Model Publication No. 61-42707) as one example of crank presses.

In this type of a pressing machine, crank shafts are supported by a frame at intervals in the horizontal direction. The rotating force of a rotation source is transmitted to one crankshaft through a clutch mechanism or the like and is then transmitted from that crankshaft to another crankshaft by means of a power transfer mechanism or the like. The rotating motion of those crankshafts is converted to a reciprocating motion, which in turn is transmitted to a slide.

Such a pressing machine, in comparison with a pressing machine wherein a slide is reciprocated by virtue of a rotating motion of a single crankshaft, is advantageous in that the length of each crankshaft is shorter and hence the crankshaft finishing accuracy and the connecting rod mounting accuracy to the crankshafts are improved, thus resulting in improvement of the machining accuracy by the pressing machine.

In this type of a conventional pressing machine, however, since the rotating force is transmitted from one crankshaft to another through a power transfer mechanism using plural gears, the force of inertia is large, and therefore such pressing machine is unsuitable for high-speed machining use. Besides, since the number of constituent parts of the power transfer mechanism is large, the structure of the same mechanism is complicated and hence the pressing machine is expensive.

SUMMARY OF THE INVENTION

It is the object of the invention to decrease the force of inertia and reduce the number of parts required for the power transfer mechanism.

A pressing machine of the present invention is characterized by including a plurality of crankshafts supported by a frame such that their axes of rotation extend in parallel; a yoke which connects the crankshafts so as to transmit the rotating motion of at least one crankshaft to another crankshaft; and a plurality of connecting rods connected at one end portions thereof to eccentric portions of the crankshafts and connected at the other ends thereof to a moving body which is mounted on the frame so as to reciprocate.

When at least one crankshaft is rotated, the rotating motion thereof is transmitted to another crankshaft by means of the yoke. The rotating motion of the crankshafts is converted to a reciprocating motion, which in turn is transmitted to a moving body such as a slide or a dynamic weight by means of the connecting rods.

According to the present invention, since a yoke for transmitting the rotating motion of at least one crankshaft to another is provided, the force of inertia is smaller and the number of parts required by the power transfer mechanism becomes smaller, in comparison with the conventional pressing machine using plural gears.

At least two such crankshafts can be included, one of which is a driving crankshaft connected to a drive source, and the connecting rods can be connected to the crankshafts. Alternatively, at least three crankshafts can be included, any one of which is used as a driving crankshaft connected to a drive source, and the connecting rods can be connected to the crankshafts other than the driving crankshaft.

In a preferred embodiment, the crankshafts are arranged at intervals in the horizontal direction, and the yoke is mounted on eccentric portions of the crankshafts. The moving body may be a slide or a dynamic weight.

BRIEF DESCRIPTION OF THE DRAWINGS

The invention will be described in conjunction with certain drawings which are for the purpose of illustrating the preferred embodiment of the invention and its modifications only, and not for the purpose of limiting the same and wherein.

DESCRIPTION OF THE PREFERRED EMBODIMENTS

Figure 1:
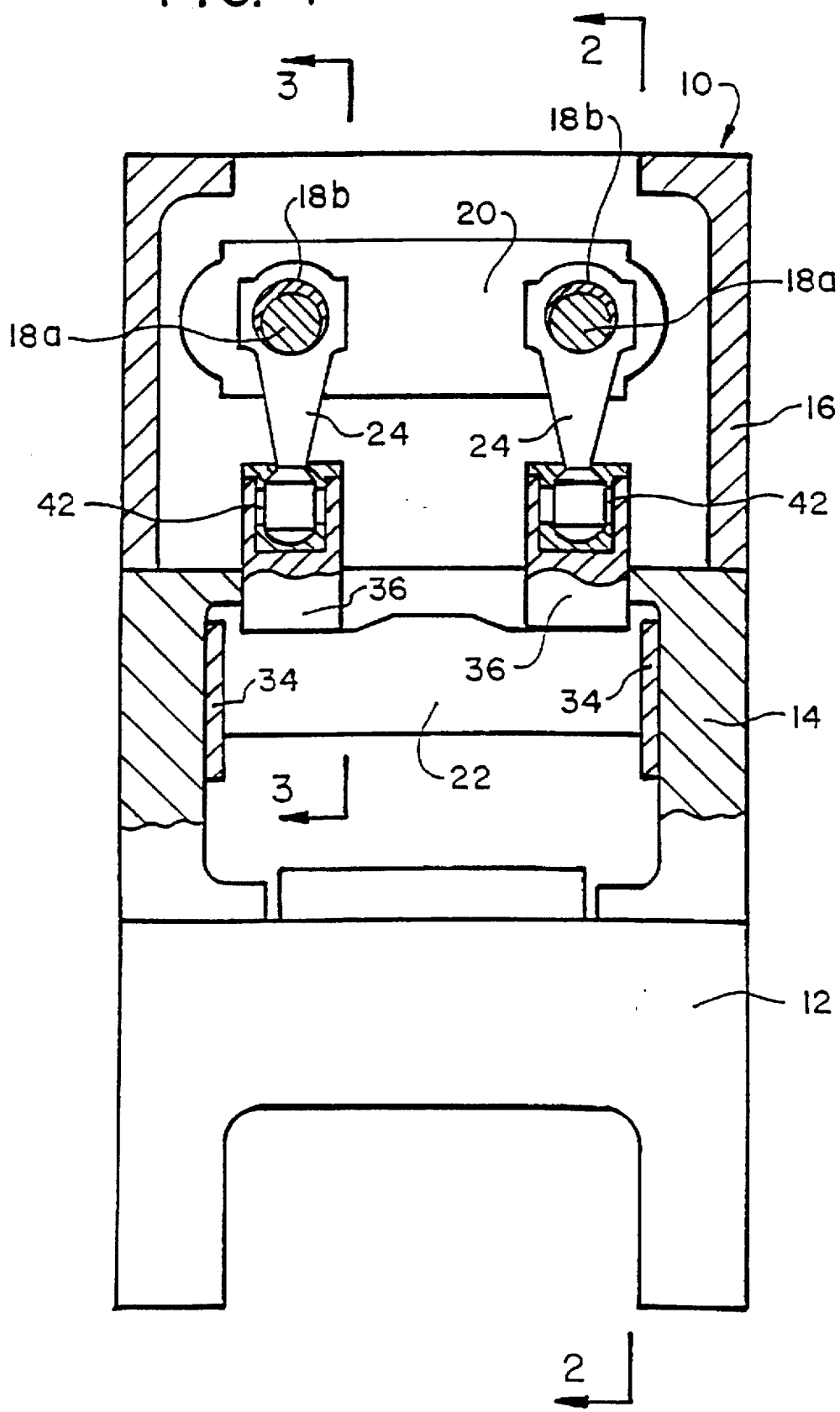
FIG. 1 is a sectional view showing one embodiment of the pressing machine according to the present invention.
Figure 2:
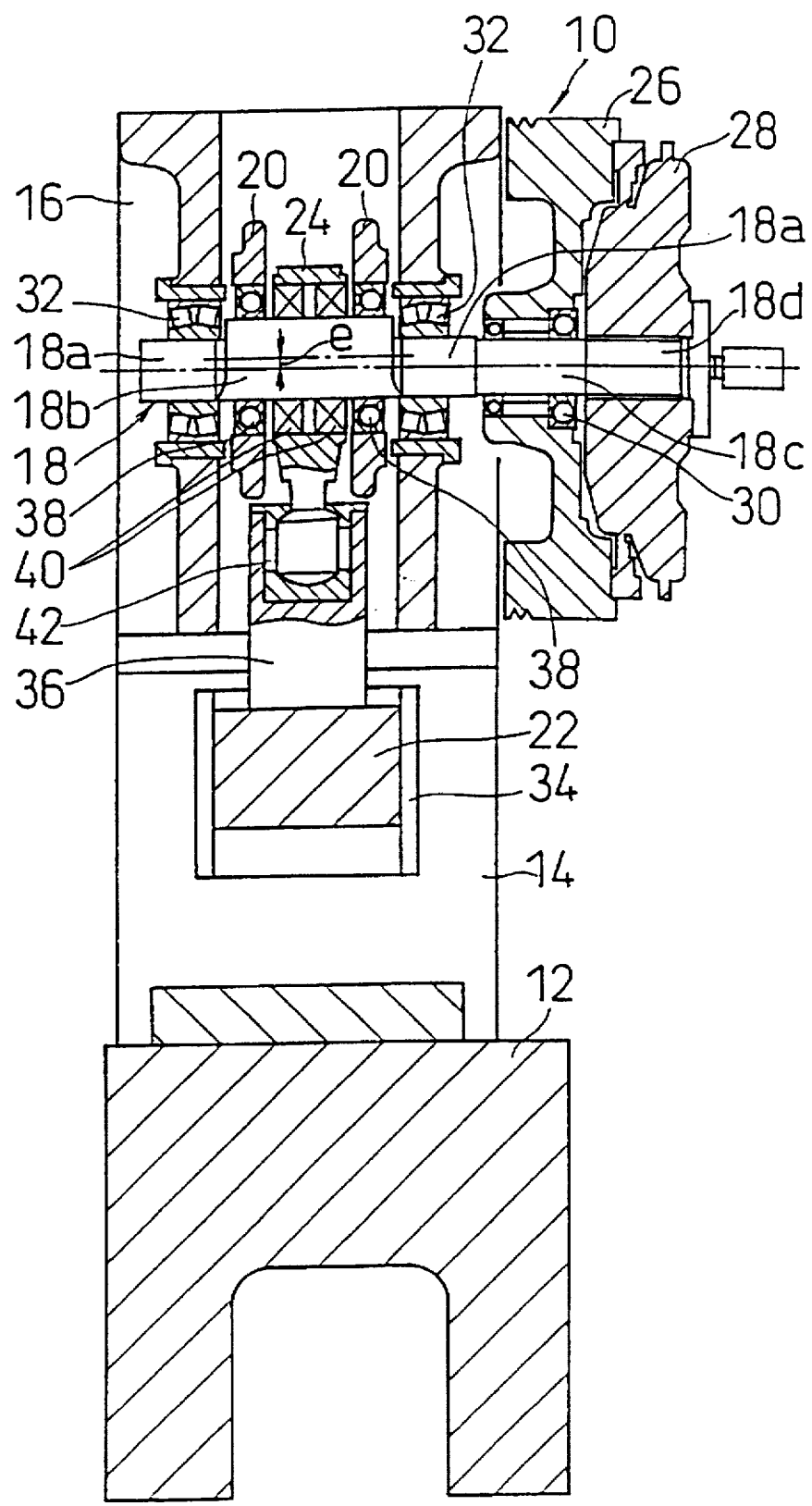
FIG. 2 is a sectional view taken along line 2—2 in FIG. 1.
Figure 3:
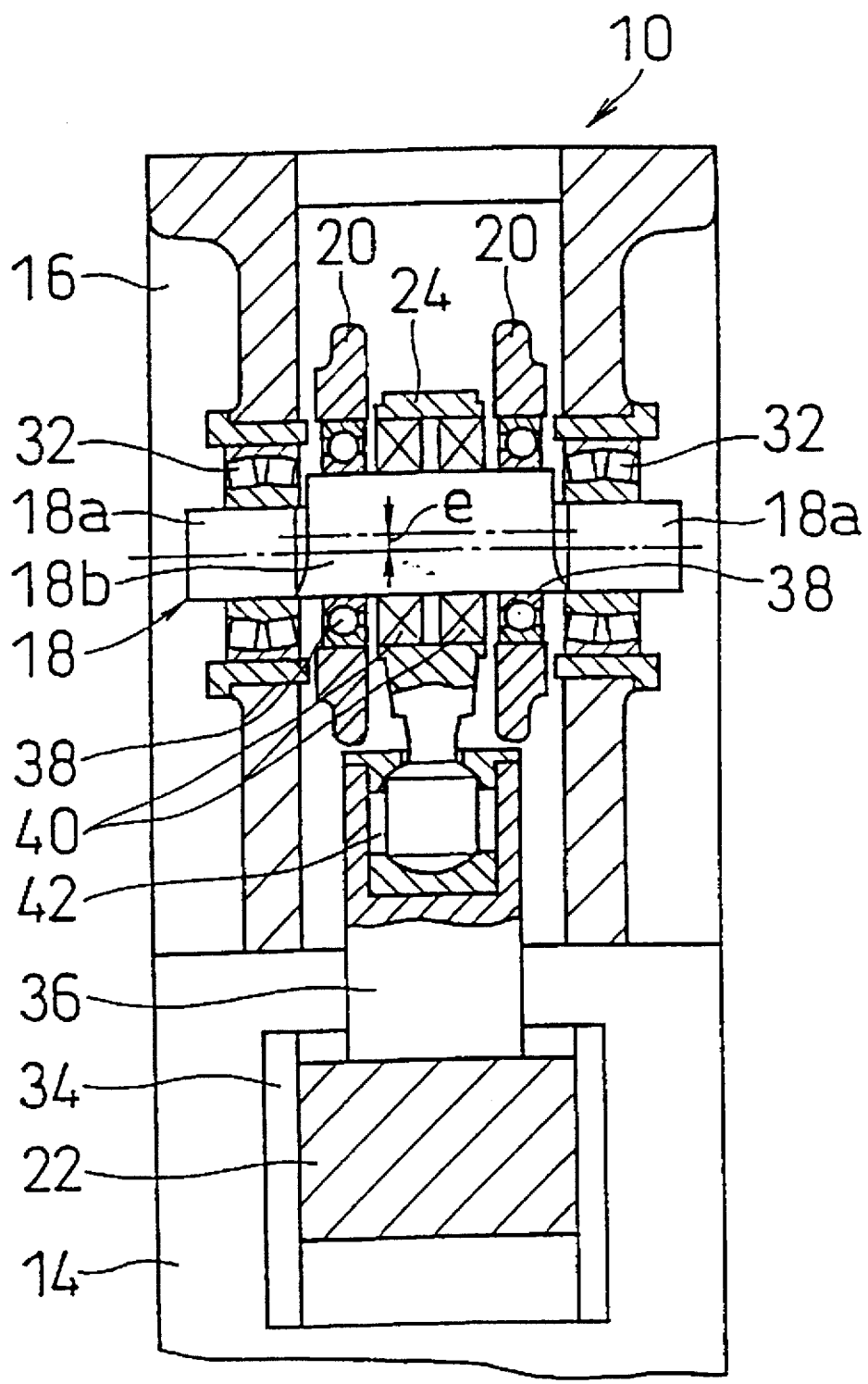
FIG. 3 is a sectional view taken along line 3—3 in FIG. 1.

Referring to FIGS. 1 to 3, a pressing machine 10 includes a lower frame 12 for placing thereon a lower die, an intermediate frame 14 mounted on the lower frame 12, an upper frame 16 mounted on the intermediate frame 14, a plurality of crankshafts 18 disposed on the upper frame 16 at intervals in the horizontal direction, a pair of yokes 20 which connect the crankshafts 18 so as to transmit the rotating motion of one crankshaft to another, a slide 22 on which an upper die mounted, and a plurality (two in the illustrated example) of connecting rods 24 for connecting the crankshafts 18 to the slide 22.

In the illustrated example, two crankshafts 18 are supported rotatably by the upper frame 16 such that their axes of rotation extend horizontally in parallel. One crankshaft 18 is a driving crankshaft which receives a uniform rotational motion of a flywheel 26 through a clutch mechanism 28. On the other hand, the other crankshaft 18 is a driven crankshaft which receives the rotation of the driving crankshaft 18. The flywheel 26 is supported rotatably by the driving crankshaft 18 through plural bearings 30. The clutch mechanism 28 is mounted on the driving crankshaft 18.

Each crankshaft 18 has a pair of main portions 18a which are borne rotatably by the frame 16 through bearings 32 and an eccentric portion 18b having an axis which is displaced with respect to the axis of the main portions. The driving crankshaft 18 has a first support portion 18c which supports the flywheel 26 and a second support portion 18d which supports the clutch mechanism 28. The eccentric portion 18b is formed between the main portions 18a. The amount of eccentricity of the eccentric portion 18b relative to the main portions 18a corresponds to the distance e. The axes of the first and second support portions 18c, 18d are the same as the axis of the main portions 18a.

A main portion of the slide 22 is mounted to the frame 14 movably in the vertical direction below the rotational axes of the crankshafts 18, along a pair of opposed slide guides 34, and is provided with a pair of red portions 36 which extend vertically over both frames 14 and 16. Both red portions 36 extend upward in parallel from both ends of the main portion of the slide 22. The movable direction of the slide 22 is restricted to only the vertical direction at its main portion by means of the slide guides 34. It is preferable that the moving direction of both rod portions 36 be limited to the vertical direction at the upper ends of both rod portions 36.

The yokes 20 are formed in the shape of a vertical plate and are opposed to each other at intervals in the axial direction of the crankshaft 18. The yokes 20 are rotatably mounted to the eccentric portion 18b of the crankshafts 18 through a bearing 38.

Each connecting rod 24 is mounted at one end portion thereof to the eccentric portion 18b of the associated crankshaft 18 rotatably through plural bearings 40 and is connected at the opposite end thereof to the upper end of the associated rod portion 36 of the slide 22 through a ball joint 42. The upper end portion of each connecting rod 24 is positioned between the yokes 20.

Thus in the pressing machine 10, the yokes 20 are mounted rotatably on the eccentric portions 18b of both crank shafts 18, so by rotation of the driving crankshaft 18, the yokes 28 are rotated about the crankshaft rotational axes by the driving crankshaft 18. Consequently, the rotating motion of the driving crankshaft 18 is transmitted by the yokes 20 to the driven crankshafts 18, whereby the driven crankshafts 18 are rotated in synchronism with the driving crankshaft 18. The rotating motion of both crankshafts 18 is converted to a reciprocating motion, which in turn is transmitted to the slide 22 by the connecting rods 24.

According to the pressing machine 10, since the rotating motion of one crankshaft 18 is transmitted to the other crankshaft 18 through the yokes 20, the force of inertia is smaller and the number of parts required for the power transfer mechanism becomes smaller, as compared with the conventional pressing machine using plural gears. Such a small force of inertia permits the pressing machine to be used as a pressing machine for high speed machining wherein the slide 22 is moved up and down at high speed. Besides, the reduced number of constituent parts of the power transfer mechanism results in the structure of the power transfer mechanism being simplified, thus permitting reduction of the apparatus cost.

Figure 4:
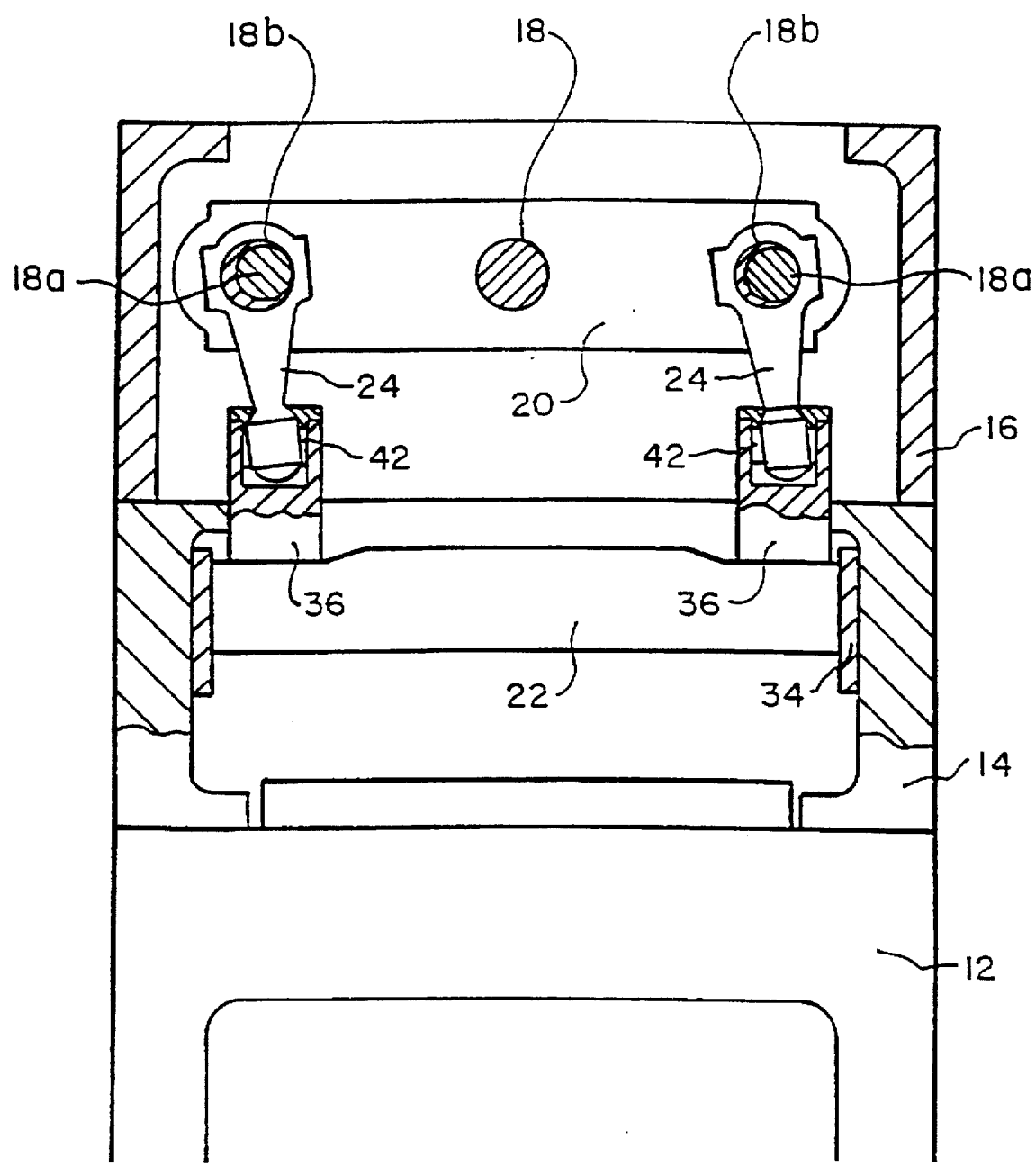
FIG. 4 is a sectional view showing another embodiment of the pressing machine according to the present invention.

A pressing machine 50 shown in FIG. 4 is provided with three crankshafts 18 which are supported by a frame 16 at intervals in the horizontal direction. The crankshaft 18 positioned centrally is a driving crankshaft like that illustrated in FIG. 2. Therefore, the driving crankshaft is of the same construction as that illustrated in FIG. 2 and it carries thereon a flywheel and a clutch mechanism though not shown. The other two crankshafts 18 are driven crankshafts like that shown in FIG. 3 and therefore have the same construction as that of the driven crankshaft 18 shown in FIG. 3.

One or more yokes 20 are mounted to eccentric portions of the three crankshafts 18 rotatably through bearings, and connecting rods 24 are mounted to the eccentric portions of the driven crankshafts 18 rotatably through one or more bearings.

Thus also in the pressing machine 50, the yokes 20 are mounted rotatably on the eccentric portions of the three crankshafts 18, so by rotation of the driving crankshaft 18, the yokes 20 are rotated about the rotation axes of the crankshafts 18 by means of the driving crankshaft 18. As a result, the rotational motion of the driving crankshaft 18 is transmitted to both driven crankshafts 18 by the yokes 20, whereby both driven crankshafts 18 are rotated in synchronism with the driving crankshaft 18. The rotating motion of both driven crankshafts 18 is converted to a reciprocating motion, which in turn is transmitted to the slide 22 through the connecting rods 24.

According to the pressing machine 50, therefore, since the rotating motion of the driving crankshaft 18 is transmitted to the driven crankshafts 18 through the yokes 20, the force of inertia is smaller and the number of parts required by the power transfer mechanism decreases in comparison with the conventional pressing machine using plural gears.

The present invention is not limited to the above embodiments. For example, in the case of a pressing machine provided with a dynamic weight, the dynamic weight, in place of the slide, may be driven by such power transfer mechanism as referred to above, or both slide and dynamic weight may be driven by such power transfer mechanism as mentioned above.

Although the invention has been described in its preferred embodiments, obviously, modifications and alterations will occur to those with ordinary skill in the art upon reading and understanding the present invention. It is intended that the invention be construed as including all such modifications and alterations so far as they come under the scope of the appended claims or the equivalent thereof.

What is claimed is:

1. A pressing machine including:
   a plurality of crankshafts supported by a frame so that their axes of rotation extend in parallel;
   a yoke which connects said crankshafts with each other so as to transmit the rotating motion of at least one crankshaft to another crankshaft; and
   a plurality of connecting rods, said connecting rods each including one end portion connected to said crankshafts and an opposite end portion connected to a pressing means, said pressing means including a moving body which is mounted on said frame so as to reciprocate.

2. A pressing machine according to claim 1, including at least two said crankshafts, one of which is a driving crankshaft connected to a drive source, and wherein said connecting rods are connected to said crankshafts.

3. A pressing machine according to claim 1, including at least three said crankshafts, any one of which is a driving crankshaft connected to a drive source, and wherein said connecting rods are connected to the crankshafts other than said driving crankshaft.

4. A pressing machine according to claim 1 wherein said crankshafts are arranged at intervals in the horizontal direction.

5. A pressing machine according to claim 1 wherein said yoke is mounted to eccentric portions of said crankshafts.

6. A pressing machine according to claim 1 wherein said moving body is a slide or a dynamic weight.

* * * * *

UNITED STATES PATENT AND TRADEMARK OFFICE
CERTIFICATE OF CORRECTION

PATENT NO. : 5,720,201
DATED : February 24, 1998
INVENTOR(S) : Akihiro Yoshida and Yoichi Uno It is certified that error appears in the above-identified patent and that said Letters Patent is hereby corrected as shown below:

Column 2 Line 66 "red portions" should read --rod portions--.

Column 2 Line 67 "red" should read --rod--.

Column 3 Line 22 "yokes 28" should read --yokes 20---.

Signed and Sealed this

Sixteenth Day of June, 1998

Attest:

BRUCE LEHMAN

Attesting Officer     Commissioner of Patents and Trademarks